United States Patent [19]

Amuny

[11] Patent Number: 5,323,529
[45] Date of Patent: Jun. 28, 1994

[54] HEAT EXCHANGER BUNDLE EXTRACTOR ASSEMBLY AND METHOD

[75] Inventor: Jim E. Amuny, Sulphur, La.

[73] Assignee: American Mechanical Services, Inc., Sulphur, La.

[21] Appl. No.: 988,456

[22] Filed: Dec. 10, 1992

[51] Int. Cl.$^5$ .............................................. B23P 15/00
[52] U.S. Cl. ..................................... 29/726.5; 29/723; 29/890.031
[58] Field of Search ...................... 29/726, 727, 726.5, 29/723, 890.031

[56] References Cited

U.S. PATENT DOCUMENTS

| | | | |
|---|---|---|---|
| 909,934 | 5/1908 | Ray | 29/726 |
| 3,567,044 | 3/1971 | Travis | 29/726 |
| 4,053,062 | 10/1977 | Travis | 29/726 |
| 4,543,711 | 10/1985 | Wada et al. | 29/726 |
| 4,625,396 | 12/1986 | Ahmed et al. | 29/726 |
| 4,805,653 | 2/1989 | Krajicek et al. | 134/166 |
| 4,856,545 | 8/1989 | Krajicek et al. | 134/166 |
| 5,169,281 | 12/1992 | Boisture | 29/726.5 |

FOREIGN PATENT DOCUMENTS

| | | | |
|---|---|---|---|
| 0650700 | 3/1979 | U.S.S.R. | 29/726 |
| 0721310 | 3/1980 | U.S.S.R. | 29/726 |

Primary Examiner—Irene Cuda
Attorney, Agent, or Firm—Browning, Bushman, Anderson & Brookhart

[57] ABSTRACT

Apparatus for extracting a heat exchanger tube assembly from a heat exchanger shell includes an extractor frame, an extractor body moveable with respect to the frame, and powered extraction members for literally moving the extractor body with respect to the frame. A plurality of rollers are provided each supporting the extractor frame and extractor body, and a plurality of respective drive motors each power one of the rollers for manipulating the apparatus relative to the heat exchanger shell. Both forward and reverse rotation of a respective roller and pivotable rotation of the roller with respect to the frame for steering capability of the apparatus may be provided by control means positioned such that the operator need not be carried by the assembly. A plurality of hydraulic cylinders each secured to the extractor frame are provided for elevating the extractor body to a desired position with respect to the heat exchanger shell for extraction and reinsertion of the tube assembly. According to the method the assembly may be easily positioned with respect to the heat exchanger shell by controlling both forward/reverse and pivotable steering of each roller with respect to the frame. Once positioned, the extractor frame and body may be elevated to a desired elevation to remove the heat exchanger tube assembly or reinsert the tube assembly into the shell without damaging the heat exchanger components.

16 Claims, 4 Drawing Sheets

HEAT EXCHANGER BUNDLE EXTRACTOR ASSEMBLY AND METHOD

FIELD OF THE INVENTION

The present invention relates to powered equipment for extracting and reinserting a heat exchanger bundle, and to improve techniques for reliably performing this operation in a more cost effective manner. More particularly, this invention relates to an improved heat exchanger bundle extractor assembly which is highly adaptable for substantially universal use, while significantly increasing the effectiveness of heat exchanger repair personnel.

BACKGROUND OF THE INVENTION

The use of powered equipment for performing the extraction and reinsertion operation for a heat exchanger bundle was necessitated by the increased advantages of large heat exchangers, and accordingly large tube bundles within those heat exchangers. Various equipment has been designed for assisting in the extraction of specific types of heat exchanger bundles, although the amortized cost of this equipment is high since its utility is substantially limited. In other cases, heat exchangers were installed in physically restricted location, or were installed with respect to other sizable or stationary equipment so that full usage of even the specialized equipment is not practical. Accordingly, extremely high labor costs are frequently required to remove and replace heat exchanger bundles. Moreover, existing heat exchanger extractor assemblies do not fully utilize the capability of skilled tube bundle extractor personnel. Even when ideally utilizing existing extractor assemblies, maintenance costs thus remain high.

The disadvantages of the prior art are overcome by the present invention, and improved methods and apparatus are hereinafter disclosed for efficiently and reliably extracting and inserting a heat exchanger bundle.

SUMMARY OF THE INVENTION

An extractor assembly according to the present invention preferably is self-propelled in a manner which allows each of a plurality of rollers or wheels supporting the assembly to be individually powered, thus substantially facilitating maneuvering of the assembly in restricted quarters in order to perform the required tube bundle extraction or reinsertion process. Both powered steering and forward/reverse rotation of the supporting wheels is preferably provided. The assembly is compact since individual drive motors may be provided closely adjacent each small diameter drive wheel, and the operator need not be supported on the assembly as it is maneuvered in place. The assembly is also adapted for use with a spreader bar and crane, so that the assembly may be used with a crane to reliably extract bundles from the heat exchanger shell spaced 10 meters or more from the floor.

Once properly positioned, a plurality of hydraulic cylinders preferably each secured to an exterior of the extractor frame may be used to elevate the extractor frame to position the extractor body properly for the removal or reinsertion operation. During the extraction or reinsertion operation, the extractor body is preferably moved linearly with respect to the extractor frame, which is stationary with respect to the heat exchanger shell. A plurality of powered motors and respective rack and pinion assemblies acting between the extractor body and frame may provide the desired forces to be transmitted to the tube bundle. A supporting pad is raised by a scissor jack for engaging the tube baffles to support the weight of the heat exchanger bundle during the extraction or reinsertion operation.

An A-frame pulling assembly hinged to an extractor body support may be used to increase the usable length of the extractor assembly while providing the desired pulling carriage to support the front end of the tube bundle as it is withdrawn from the shell. The A-frame assembly is thus pivotably movable from an operable position for pulling to an inactive position to maximize the usable length of the assembly. The extractor body is ideally adapted for use with a variety of end attachment members which are each designed for specific applications, thereby enhancing the versatility of the extractor assembly and reducing overall costs. One end attachment member utilizes a pair of long forks to fit under the tube bundle. A pull plate is pivotably secured to the extractor body for positioning in one position for removal of the tube bundle, and in another position for bundle insertion.

The methods of the present invention reduce the likelihood of further harming an extracted bundle to be repaired, or of injuring a new or repaired bundle being inserted into the shell. The bundle is extracted or inserted with controllable forces to minimize jarring, while also reducing the necessity of applying high forces by properly aligning the extractor assembly centerline and the heat exchanger centerline. The versatility of the extractor assembly allows more cost effective methods to be used for performing the tube bundle removal or reinsertion operation, while also improving the quality and reliability of this operation.

It is an object of this invention to provide improved techniques for easily and reliably positioning an extractor body of an extractor assembly at a proper position in alignment with a heat exchanger tube bundle. The techniques of this invention may be used to position the tube extractor body at both its proper vertical position and at its proper axial alignment position with the heat exchanger shell. The use of selected specialized equipment as part of the overall extractor assembly significantly reduces the cost for this operation.

It is a feature of this invention that the extractor assembly is self-propelled, and that a plurality of its supporting wheels are individually actuable for maneuvering the assembly in constricted places. A plurality of a hydraulic cylinders are used to position the extractor body at its desired elevation. It is a further feature of this invention that the assembly is adapted to be used with a spreader bar and crane for vertically supporting the extractor assembly while extracting or installing a tube bundle from a shell substantially raised off the floor. Yet another feature of this invention is that the tube extractor body is powered by a plurality of drive motors and rack and pinion mechanisms for providing controllable, non-jarring extraction forces. Still another feature of this invention is that a pivotable A-frame assembly may be used to increase the overall usable length of the extractor assembly. A plurality of specialized end attachment members each adapted for specific extraction operations or certain types of equipment may be used with the substantially universal extractor body.

An advantage of this invention is that specialized tooling may be used with a substantially universal extractor assembly to significantly reduce extraction costs while enhancing the reliability of the operation. The assembly may be easily maneuvered by providing both pivotable and rotational control for each of a plurality of supporting wheels. The cost of the overall extraction operation is significantly reduced by benefitting from specific advantages of individualized equipment within the assembly.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
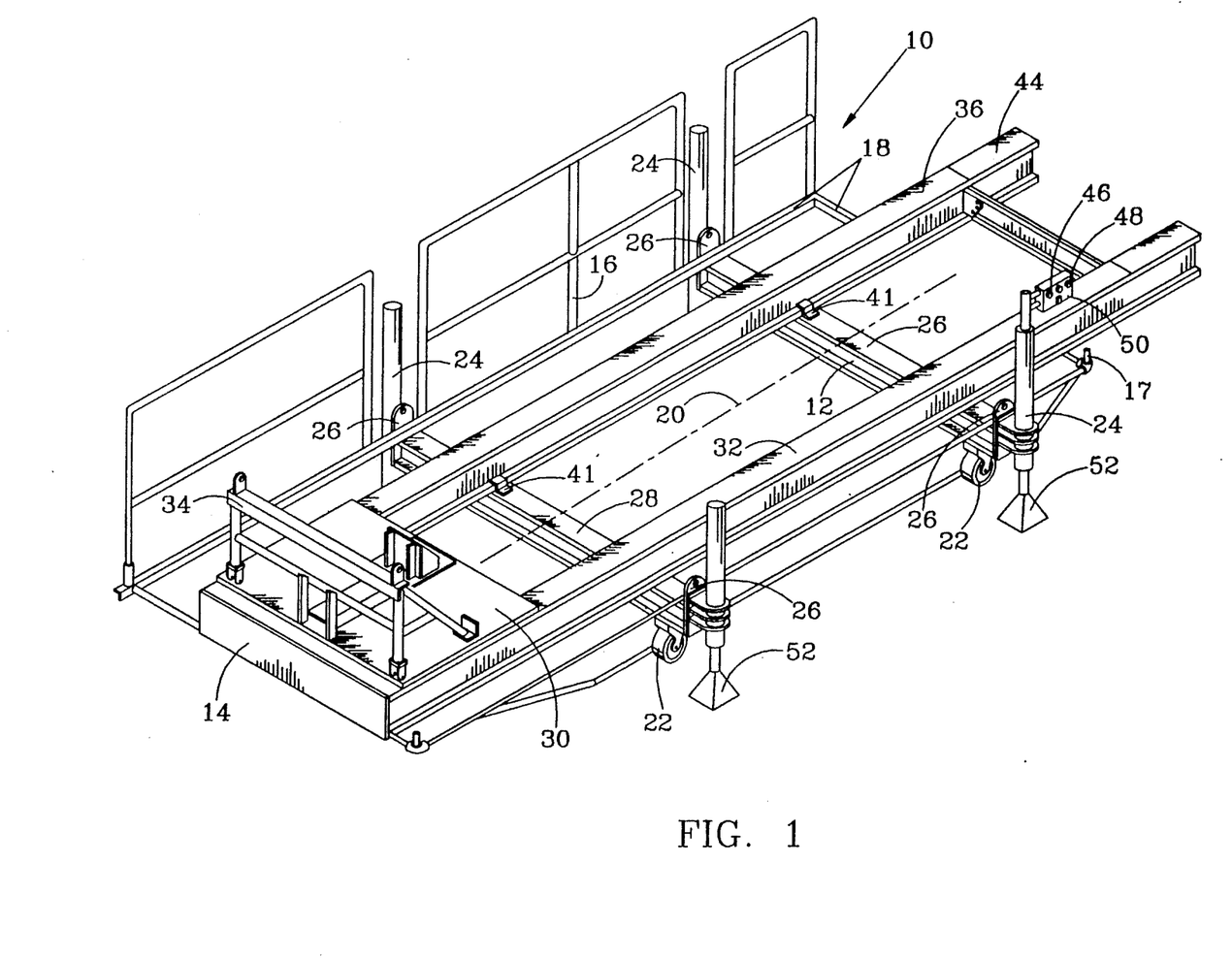
FIG. 1 is a simplified pictorial view of the primary components of one embodiment of a heat exchanger extractor assembly according to the present invention, with some of the components removed for better illustration and explanation of the depicted components.

FIG. 1 generally depicts one preferred embodiment of a heat exchanger tube extractor assembly 10 according to the present invention. Assembly comprises of frame 12 which remains stationary during the removal and reinsertion operation with respect to the heat exchanger shell, and an extractor body 12 which moves in a linear fashion with respect to the extractor frame for pulling the heat exchanger tube out of its shell, and for pushing the tube assembly linearly into the shell. The assembly as depicted in FIG. 1 includes removable handrails 16 and catwalk supports 18 for increasing the safety of the overall operation. Those skilled in the art will understand that the extractor assembly 10 generally shown in FIG. 1 has a centerline 20 which divides the left side from the right side of the assembly, and that the sides of the assembly 10 are substantially symmetrical. It should thus be understood that the handrails 16 and catwalk supports 18 generally shown on the left side of the extractor assembly in FIG. 1 also would be conventionally provided on the right side of the assembly, although those right side components are not shown.

The assembly 10 preferably includes at least four hydraulically powered caster wheels or tires 22 for easily rolling the assembly to a desired location for alignment with the heat exchanger. A plurality, and preferably four, hydraulic cylinders 24 are also provided for raising the extractor frame and extractor body to its desired elevation with respect to the heat exchanger shell once the assembly 10 has been positioned properly on the floor. The extractor frame includes front and rear I-beam 26, 28, and each of the rollers 22 is pivotably mounted beneath a respective frame I-beam. Each of the hydraulic cylinders 24 is connected to an exterior member or plate 26, which in this embodiment also serves as a spreader bar securing member, as explained subsequently. One or more of the hydraulic cylinders alternatively may be connected to an end face of the I-beams 26, 28, or to another exterior frame member.

The extractor body 14 includes an extractor body support 30, which supports the front end of the heat exchanger tube assembly during the removal and reinsertion operation. The extractor body 14 moves linearly with respect to the carriage member 32 discussed subsequently. An A-frame assembly 34 is pivotably connected to the body support 30 for reasons explained below. The carriage member 32 includes a left side and a right side I-beam 36, 38, and a plurality of connecting beams 40. The extractor body moves linearly with respect to both the frame 22 and the carriage member 32, and the carriage member 32 preferably also moves linearly with respect to the frame 12, as also explained below. For the present, it may be seen that guide plates 41 limit movement of the carriage member 32 with respect to the frame 12 to linear movement along axis or centerline 20. An end attachment member 44 may be selectively removed from and attached to each of the elongate carriage member I-beams 36, 38 for reasons explained subsequently.

The assembly 10 may be easily controlled by an operator, who need not be supported or carried by the assembly as it is manipulated with respect to the heat exchanger shell, thereby maximizing the capability of the assembly while reducing its size and cost. The operator may walk beside the assembly and activate various forward/reverse controls 46 and steering controls 48 on a control panel 50, which optionally may be temporarily or permanently mounted to one of the cylinders 24. The control panel 50 may activate control motors or cylinders discussed subsequently by remote control, or a flexible umbilical cord may electrically interconnect the control panel and wiring to the various control motors, pumps, or cylinders required for operation of the assembly. The hand rails 26 may be easily removable from the assembly and utilized only when necessary or desirable for operator safety, and various hand rail supports, such as vertical pin 17, may conventionally be provided for supporting the hand rail 16 when in use.

Once the assembly 10 is at its proper position on the floor with respect to the heat exchanger shell and the centerline 20 of the assembly is parallel with the centerline of the heat exchanger shell, the plurality of hydraulic cylinders 24 may be simultaneously activated for elevating the extractor frame 12 and the body 14 to its desired position for removal or insertion of the heat exchanger tube assembly with respect to the shell. Each of the hydraulic cylinders 24 is accordingly provided with a conventional foot pad 52 so that the extractor frame and heat exchanger shell will be reliably supported by the four cylinders during removal or reinsertion operation. The size and hydraulic lifting capability of each of the cylinder 24 will depend upon desired capability of the assembly and the known or presumed elevation of the various heat exchangers which the assembly is designed to service. For typical application, each of the hydraulic cylinders 24 may have the capability of supporting approximately 15 tons of weight, and the cylinders 24 depicted in FIG. 1 may raise the base of the A-frame assembly 34 to an elevation of approximately three meters.

Figure 2:
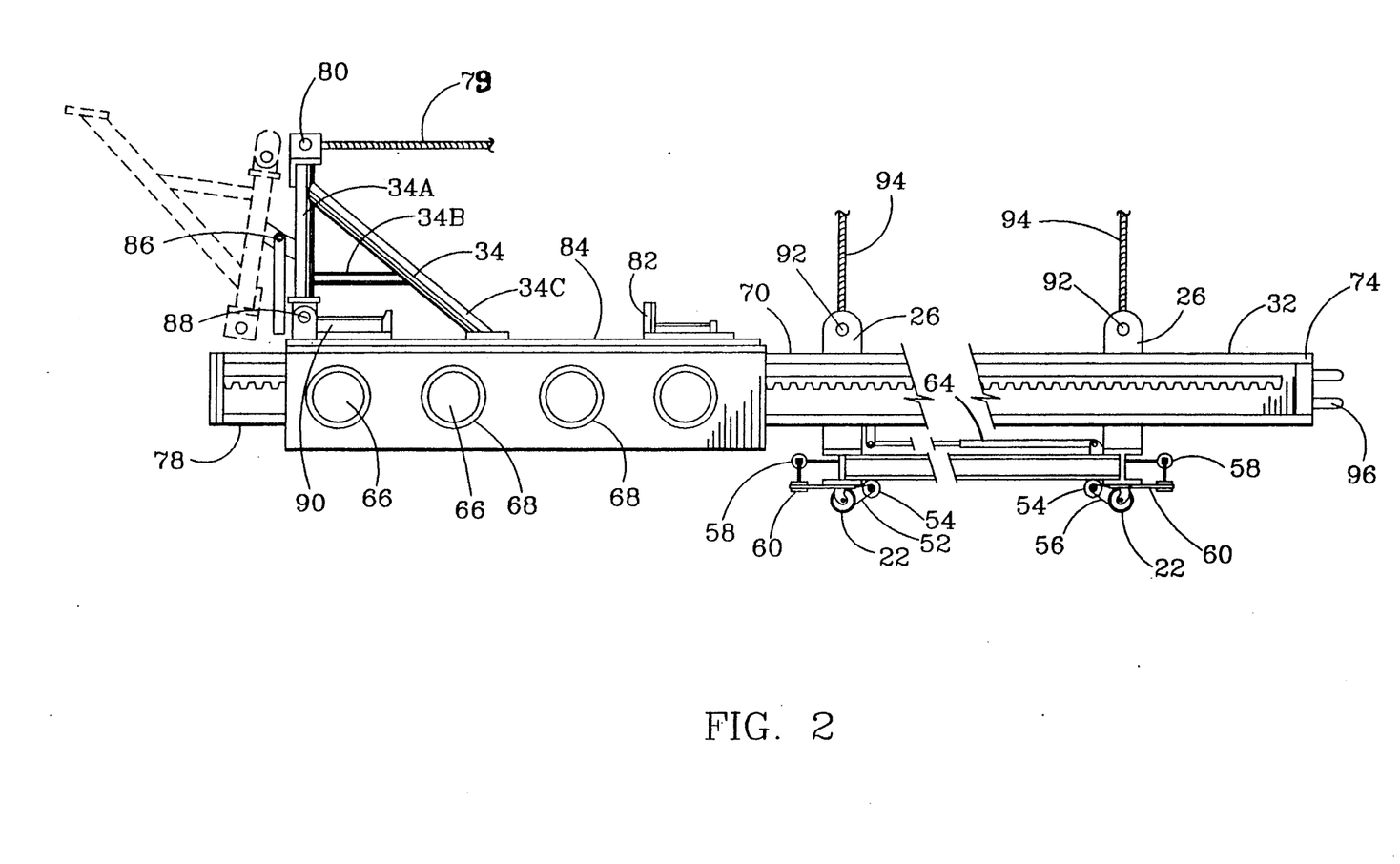
FIG. 2 is an elevation view of the extractor assembly generally shown in FIG. 1, and illustrates the drive mechanism for moving the extractor body with respect to the extractor frame. As with FIG. 1, many of the components are removed for clarity of the depicted components.

FIG. 2 depicts a suitable drive means for controlling forward/reverse rotation of each of the rollers 22. Hydraulic drive motor 54 is provided for each of the rollers, and is preferably mounted below the elevation of the top of the I-beams 26, 28 so that the assembly, when moved, is low to the ground, and so that assembly may be used successfully with heat exchangers mounted less than one meter from the floor. Each hydraulic motor 54 is capable of forward and reverse rotation, so that chain 56 and the respective rollers 22 may be driven forward or reverse by operating the controls on the panel 50. Another hydraulic drive unit, such as hydraulic cylinder 58 and a steering mechanism 60, is also provided for controlling the pivotable movement of each roller 22 with respect to the frame, so that the assembly may be steered from the front roller, the rear rollers, or all rollers. The steering control mechanism 60 may consist of a conventional steering tie rod. Two or more cylinder assemblies 64 connect the extractor frame assembly 12 and the carriage member 32, so that limited linear movement of the carriage member 32 with respect to the frame 24 is provided for ideally distributing the weight of the heat exchanger tube assembly on the four hydraulic cylinders 24 during the insertion and removal operation.

Referring again to FIGS. 2, the extractor body 14 moves linearly with respect to the carriage member 32 by a plurality of drive means, which may comprise four hydraulic motors 66 each rotating a respective pinion gear 68. Each gear 68 is aligned for meshing with rack gear 70, which is fixed to the I-beams 36, 38. Only a portion of the rack 70 is clearly depicted in FIG. 2, although those skilled in the art will appreciate that this rack 70 preferably extends from the front end 74 to the rear end 76 of the carriage member 32.

The A-frame 34 is shown in solid lines in FIG. 2 in its operable position, i.e., structural members 34A, 34B and 34C form a generally A-shaped configuration. In its operable position, a cable or chain 79 may be connected to upper attachment device 80 to pull the tube assembly from the shell as a body 14 moves linearly with respect to the carriage member 32. Once the tube assembly (not shown) is at least partially removed from the heat exchanger shell, a front cradle or push/pull plate 82 securable to the body support or top plate 84 of the extractor body may be positioned behind the shell flange, so that this plate 82 rather than the A-frame 34 pulls the tube assembly from the shell during linear movement of the extractor body 14.

It is a feature of this invention that the A-frame 32 is pivotably connected at 86 to the body support 84, so that securing pin 88 may be removed and the A-frame rotated about hinge 86 to an inactive position, as shown in dashed line in FIG. 2. In its inactive position, a second cradle or push/pull plate 90 may be used for pulling or pushing on the flange of the heat exchanger tube assembly, thereby maximizing the usable length of the assembly 10 for accommodating long tube assemblies while keeping the assembly 10 itself relatively short. When plate 90 is employed, plate 82 may either be removed, or the tube bundle may be positioned above the plate 82 while plate 90 supports the tube bundle front flange.

FIG. 2 also depicts the outer frame members 26 which may be interconnected to the respective cylinders 24. As previously noted, these members 26 may also serve as spreader beam connection members, and each member 26 may be provided with an aperture 92 for receiving a respective cable or chain 94 shown in dashed lines in FIG. 2, with the upper end of the cables or chains 94 being connected to the spreader beam discussed subsequently. For the present, it should be understood when the spreader beam and the cables 94 are utilized for supporting the extruder frame and body at a desired elevation above the floor, the hydraulic jacks previously discussed normally are not employed, since the extractor assembly 10 and the tube assembly to be removed or inserted from the heat exchanger shell would then normally be supported by an overhead crane or similar device. Assuming the hydraulic cylinders 24 rather than the spreader beam are utilized to maintain the extractor frame at its desired elevation during the tube assembly insertion and removal operation, the hydraulic cylinder 64 shown in FIG. 2 may be used to move the I-beams 36 and thus the extractor body 14 with respect to the frame 12, in order to more evenly distribute the weight of the assembly 10 and the heat exchanger tube assembly on each of the hydraulic cylinders 24. Accordingly, it should be understood that the controls on the panel 50 may be regulated by the operator to activate the plurality of hydraulic motors 66 and move the extractor body 14 along the length of the I-beams 36, 38 during the extraction or reinsertion operation, and that separately the hydraulic cylinders 64 may be simultaneously or sequentially operated to move the I-beams 36, 38 linearly with respect to the frame 12 in order to maintain proper weight distribution on each of the foot pads 52 of the hydraulic cylinders 24. FIG. 2 also discloses upper and lower attachment ears 96 at the front end 74 for receiving a selected end attachment, which is discussed subsequently.

Figure 3:
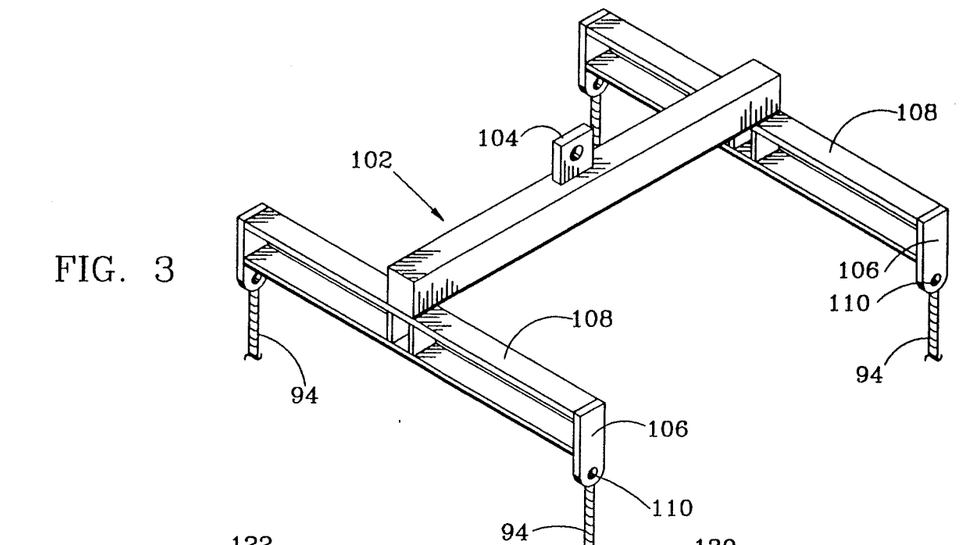
FIG. 3 is a pictorial view of an exemplary spreader beam for connection with the extractor assembly generally shown in FIGS. 1 and 2 to use the extractor assembly with an overhead crane.

Referring now to FIG. 3, a suitable spreader beam 102 is depicted for supporting the assembly 10 generally shown in FIG. 1 at a desired elevation when the hydraulic jacks 24 are not employed. Normally, the spreader beam 102 will be used when the heat exchanger tube assembly is positioned by above the floor at an elevation such that the hydraulic jacks 24 cannot raise the extractor body 14 to the necessary elevation. In such cases, a conventional overhead crane may be used, and a crane hook and cable connected to center attachment support 104 of the spreader beam 102. Spreader beam 102 has a generally H-shaped structural configuration, and a flange 106 at the ends of each of the beams 108 includes an aperture 110 or similar mechanism for connection to the cables 94 shown in dashed lines in FIG. 3.

Figure 4:
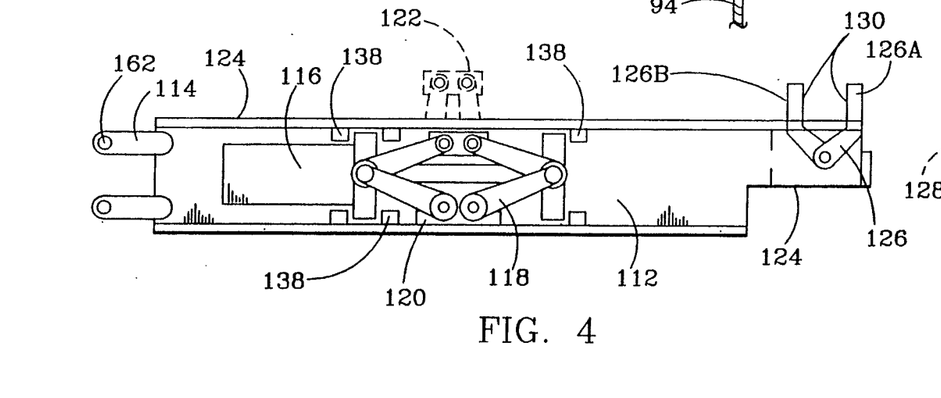
FIG. 4 is a simplified elevation view of a scissors jack assembly according to the present invention for supporting the heat exchanger tube assembly as it is both withdrawn from and reinserted into the shell.

FIG. 4 discloses one embodiment of an end attachment 112 for connection to each of the I-beams 36, 38 shown in FIG. 1. Thus the end attachment 44 shown in FIG. 1 may be removed and end attachment 112 substituted therefore, with the interconnection between the I-beams 36, 38 and the end attachment 112 being made by the ears 96 shown in FIG. 2 and the complimentary ears 114 shown in FIG. 4. The end attachment 112 may, however, be formed as a unitary member consisting of a pair of I-beams spaced for interconnection to the I-beams 36, 38, and suitable cross beams for supporting a 50 ton hydraulic cylinder assembly 116 and a scissors jack assembly 118. The bottom pad 120 of the scissors jack assembly may be secured to the spaced I-beams of the end attachment 112, or the elevation of the bottom pad 120 can be fixed by another structural support (not shown) extending directly from the pad 120 to the floor. In either case, actuation of the cylinder 116 will change the elevation of the top pad 122 with respect to the upper surface 124 of the end attachment 112. Accordingly, this hydraulic cylinder and scissors jack assembly may be activated for engaging baffles (not shown) within the tube assembly for further supporting the tube assembly as it is withdrawn from or reinserted into the shell. Those skilled in the art will understand that additional hydraulic cylinder and scissors jack assemblies may be provided at selected locations along the length of the carriage assembly 32. In each case, the hydraulic cylinder and the pad 122 will preferably be generally aligned with the central axis 20 of the assembly and accordingly will engage a tube assembly baffle at a location directly below the centerline of the tube assembly.

Those skilled in the art will appreciate that the position of the hydraulic cylinder 116 and scissors jack 118 may be easily adjusted along the axial length of the end attachment 112 or along the axial length of the carriage member 32, so that the cylinder and hydraulic jack may be positioned as desired for a particular operation, secured in place, and thereafter moved to another position along the length of the central axis 20. Finally, those skilled in the art will appreciate that various mechanisms may be utilized for supporting the weight of the heat exchanger tube assembly as it is withdrawn from or reinserted into the heat exchanger shell, and that the components depicted in FIG. 4 and discussed above are merely illustrative of a suitable mechanism for accomplishing this purpose. Respective guide blocks 138 or other suitable mechanisms may be used for allowing the hydraulic cylinder 116 and the scissors jack assembly 118 to move laterally, i.e., in a direction traverse to the centerline 20, with respect to the I-beams 36, 38, so that the top pad 122 may be maintained in alignment with the centerline of the heat exchanger tube assembly even if minor variations exist between the tube assembly centerline and the centerline 20 of the overall extractor assembly.

Figure 5:
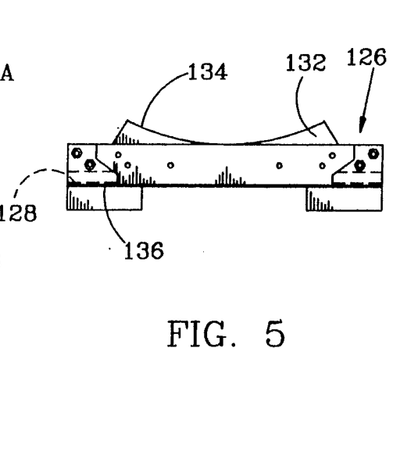
FIG. 5 is an end view of the push/pull plate according to this invention.

Referring to FIGS. 4 and 5, the end attachment 112 may also include a front cross beam 124 for supporting a push/pull plate 126 pivotably connected to the beam 124 by pin 128. When the plate 126 is in the position shown by 126A in FIG. 4, the surface 130 of the plate is designed for positioning against the heat exchanger tube assembly flange, so that the plate 126 transmits forces to pull the flange and thus the heat exchanger tube assembly from its shell. When the plate 126 is rotated to the position 126B as shown in FIG. 4, the surface 130 presses against the flange of the heat exchanger tube assembly to push the heat exchanger tube assembly into the shell. The plate 126 may thus be rotated from the pull position to the push position, or the pin 128 may be removed and the plate 126 reinstalled in the alternative position. FIG. 5 shows further details with respect to this push/pull plate 126, and more specifically illustrates an upper flange 132 having a curvature 134 for cooperating with the front flange of the heat exchanger tube assembly. Push/pull plate 126 includes an aperture 136 for accommodating the pin 128 shown in FIG. 4. Those skilled in the art will understand that a particular push/pull plate 126 may be easily removed and another push/pull plate having different dimensions substituted therefore for cooperating with the heat exchanger tube assembly flange. It should be understood that the flange 126 will normally be positioned directly below the centerline of the heat exchanger tube assembly, which in turn is directly above and parallel with the centerline 20 of the assembly 10.

Figure 6:
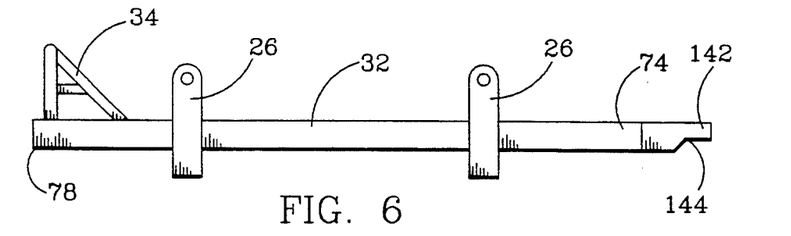
FIG. 6 is a simplistic view of the carriage member of the extractor body generally shown in FIG. 1, with one embodiment of an end extension member at the end of the carriage portion.
Figure 6A:
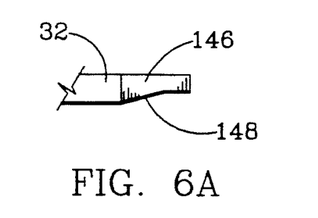
FIG. 6A-6D each depict a portion of the carriage member generally shown in FIG. 6 and a different version of an end extension member.
Figure 6B:
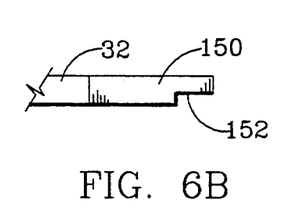
Figure 6C:
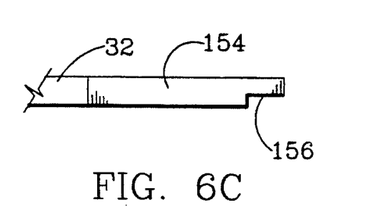
Figure 6D:
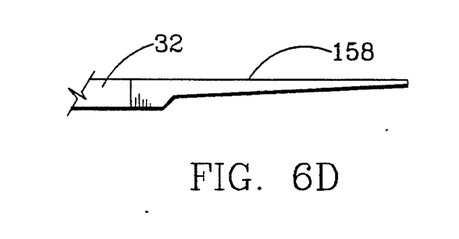

Referring now to FIG. 6, the carriage member 32 is simplistically depicted, and the A-frame assembly 34 is shown at the rear 78 of the carriage member. The approximate positions of the end plates and spreader beam securing members 26 is also generally illustrated. An end attachment 142 is removable mounted to the front end 74 of the carriage member 32. The carriage member 32 discussed earlier has a typical length of approximately six meters, although obviously this length may be varied depending on the desired overall length of the extractor assembly and the requirements for the heat exchangers which it is designed to service. End attachment member 142 shown in FIG. 6 has a length of approximately one-half meter, and it may be seen that a front lower portion includes a cut-out 144 for cooperation with one type of heat exchanger shell and tube assembly. As discussed earlier, the end attachment 142 may be easily removed, and a new attachment 146 as shown in FIG. 6A may be mounted to the end of the carriage member 32. The end attachment 146 has a length of approximately one meter, and its lower portion has cut-out as shown at 148 for cooperation with a different type of heat exchanger shell and tube assembly. FIG. 6B illustrates another end attachment 150 mounted to the end of carriage member 32, with end attachment 150 having a length of approximately two meters and a front lower portion 152 removed as shown for accommodating yet another heat exchanger configuration. Still another end attachment 154 is shown in FIG. 6C secured to the front end of the carriage member 32. The end attachment 154 has a length of approximately three meters, and has a lower front end cut-out portion 156 similar to cut-out in end attachment 150. Finally, still another end attachment 158 is shown in FIG. 6D mounted to the end of carriage member 32. End attachment 158 comprises a pair of elongate forks having a length of approximately three and a half meters. The forks 158 are specifically designed to slide under the heat exchanger tube assembly for assisting and lifting the tube assembly upward and thereby removing some of the sliding friction between the tube assembly and the shell during the insertion and removal operation. The length and configuration of the end attachments may be varied, and those illustrated in the figures are discussed herein for the purpose of understanding the full capability of the assembly according to the present invention. The versatility of this apparatus may thus be easily altered to accommodate various heat exchanger designs. Other end attachments may thus be formed having configurations similar or varied from those discussed herein.

Figure 7:
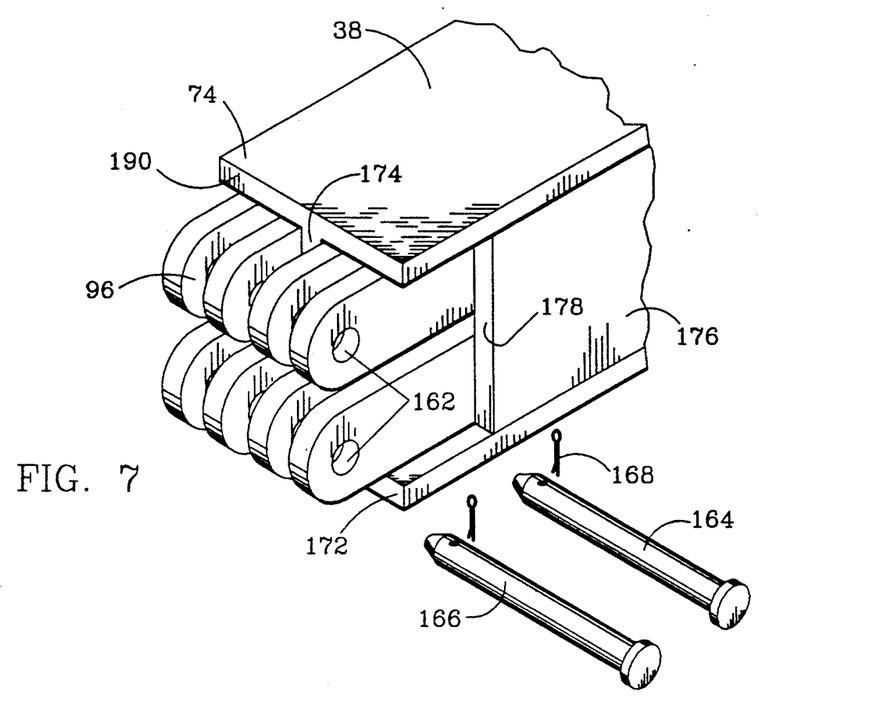
FIG. 7 is a pictorial view of a suitable connection for interconnecting the carriage member shown in FIG. 6 with any of the end attachments shown in FIGS. 6A-6D.

FIG. 7 is a pictorial view of a suitable mechanism for interconnecting the front end of beams 36, 38 with a selected end attachment as discussed above. Accordingly, it should be understood that front end 74 of a representative I-beam 38 is provided with upper and lower projecting ears or lugs 96, which are simplistically shown in FIG. 2. The ears or lugs 96 are spaced apart, and the gap between adjacent upper and lower ears is adapted to be substantially filled by a similar ear (not shown) at the rear end of one of the selected end attachments. The ears or lugs on both the beams 36, 38 and on the end attachment members include apertures 162. Apertures 162 in the ears 114 are generally shown in FIG. 4. It should be understood that the I-beams 36, 38 of the carriage member 32 and the corresponding I-beams of the end attachments are configured to engage on multiple surfaces when the apertures 162 are substantially aligned for receiving the upper and lower pins 164, 166. The pins 164, 166 thus rigidly mount each of the end attachments to the carriage member 32, and inadvertent disengagement is prevented by the cotter pins 168. A particular end attachment may be easily removed by removing the cotter pins 168 and the pins 164, 166, and a new end attachment mounted to the front end of the carriage assembly 32. When a particular end attachment is mounted to a particular I-beam, such as beam 38, end surfaces of the end attachment will be in substantially planar engagement with the planar surfaces 170 and 172, as well as the planar sub surface 174, of the I-beam 38. Either or both the I-beams 36, 38 and the end attachment members may also include side plates 176 welded between the upper and lower flanges of the I-beams, and if desired these side plates 176 may also engage each other at surface 178.

The method of the present invention for extracting a heat exchanger tube assembly from heat exchanger shell or for reinserting a heat exchanger tube assembly within a heat exchanger shell will be suggested by the foregoing disclosure. An extractor frame and extractor body are supported from a plurality of rollers. Each of the plurality of rollers is powered with a separate roller drive motor. By selectively activating each of a plurality of roller drive motors, the apparatus may be moved to a position such that the extractor frame and extractor body are positioned below but generally aligned with respect to the heat exchanger shell. By selectively activating each of the plurality of roller drive motors, both forward and rotation of each of the rollers may be controlled, and pivoting of each of the plurality of rollers with respect to the actuator frame may be controlled to steer the assembly to its desired location on the floor. To elevate the extractor frame and extractor body, the plurality of fluid-powered cylinder assemblies may each be connected to an exterior member of the extractor frame, and the cylinders may be powered simultaneously to controllable raise or lower the extractor frame and extractor body. Final adjustment "leveling" of the extractor frame and extractor body with respect to the heat exchanger may be obtained by selectively powering individual ones of the plurality of hydraulic cylinders 24. Once the extractor frame and extractor body are raised to a desired elevation with respect to the heat exchanger shell, the heat exchanger tube assembly may be interconnected with the extractor body. The extractor body is then moved linearly with respect to the extractor frame to withdraw the tube assembly from the shell, or may be moved linearly to reinsert the tube assembly into the shell. The A-frame assembly may be pivotably connected to an extractor body support, and selectively positioned between an operable position for extracting the heat exchanger tube bundle at least partially from the heat exchanger shell, and an inoperable position whereby the A-frame is pivoted away from the extractor shell to increase the usable length of the extractor frame. Further details with respect to the operation of the assembly as described herein will be apparent from the foregoing description.

The embodiments of the invention described above and the methods disclosed herein will suggest numerous modifications and alterations to those skilled in the art, which modifications and alternations are not specifically discussed in this application. It should be understood, however, that such further modifications and alterations may be made without departing from the spirit and scope of the invention, which should be understood to be defined by the scope of the claims in view of this disclosure.

What is claimed is:

1. Apparatus for extracting a heat exchanger tube assembly from a heat exchanger shell and for reinstalling a heat exchanger tube assembly into the heat exchanger shell, comprising:

an extractor frame;

an extractor body movable with respect to the extractor frame and having a force transmitting member for connection to the heat exchanger tube assembly;

extraction drive means for linearly moving the extractor body with respect to the extractor frame;

a plurality of rollers each secured to the extractor frame for supporting the extractor frame and the extractor body;

a plurality of roller drive motors each supported on the extractor frame for powering a respective one of the plurality of rollers for manipulating the apparatus relative to the heat exchanger shell; and control means for actuating selected ones of the plurality of roller drive motors.

2. The apparatus as defined in claim 1, wherein the control means includes a forward/reverse control for selectively actuating the respective roller drive motor to control both forward and reverse rotation of the respective roller.

3. The apparatus as defined in claim 2, further comprising:

a plurality of powered steering units each for controlling pivotable orientation of a respective roller with respect to the extractor frame in response to the control means to steer the apparatus.

4. The apparatus as defined in claim 1, further comprising:

a plurality of hydraulic cylinders secured to the extractor frame for raising the extractor frame and the extractor body to a desired elevation with respect to the heat exchanger shell for extraction and reinstalling the tube assembly.

5. The assembly as defined in claim 1, wherein the extractor body further comprises:

an extractor body support; and an A-frame assembly pivotably connected to the extractor body support and positionable between an operable position for extracting the heat exchanger tube bundle at least partially from the heat exchanger shell, and an inoperable position whereby the A-frame assembly is pivoted away from the heat exchanger shell to increase the overall usable length of the assembly.

6. The apparatus as defined in claim 5, wherein the extractor body force transmittal member comprises:

a push/pull plate pivotably connected to the extractor body support and positionable in a pull position for positioning behind a heat exchanger flange for extraction of the heat exchanger tube assembly, and in a push position for engaging the front of the heat exchanger flange for reinsertion of the heat exchanger tube assembly.

7. The apparatus as defined in claim 1, further comprising:
an elongate carriage member for supporting the extractor body; and
a selected one of a plurality of attachment end members for selective interconnection with the elongate carriage member and for interconnecting the extractor body and the heat exchanger tube assembly.

8. The apparatus as defined in claim 7, further comprising:
a plurality of ears each extending outward from an end of each of the elongate carriage member and the selected one of the attachment end members, each of the ears having an aperture therethrough for receiving a pin to interconnect the elongate carriage member and the respective attachment end member.

9. The apparatus as defined in claim 1, further comprising:
the extractor frame including a plurality of spreader bar securing members; and
a spreader bar for interconnection with the extractor frame for supporting the extractor frame and the extractor body from the spreader bar.

10. The apparatus as defined in claim 1, wherein the extraction drive means comprises:
a plurality of extraction drive units each for linearly moving the extractor body relative to the extractor frame; and
a plurality of rack and pinion assemblies each for cooperating with a respective extraction drive unit for linearly moving the extractor body relative to the extractor frame.

11. The apparatus as defined in claim 1, further comprising:
one or more scissor jack assemblies for selectively elevating a supporting pad with respect to the extractor frame to support the heat exchanger tube assembly when removed from the heat exchanger shell.

12. The apparatus as defined in claim 11, further comprising;
each of the one or more scissor jack assemblies being movable laterally with respect to the extractor frame; and
one or more guide mechanisms each for guiding a respective one of the one or more scissor jack assemblies during lateral movement with respect to the extractor frame.

13. Apparatus for extracting a heat exchanger tube assembly from a heat exchanger shell or for reinserting a heat exchanger tube assembly within the heat exchanger shell, comprising:
an extractor frame;
an extractor body movable with respect to the extractor frame and having a force transmitting member for connection to the heat exchanger tube assembly;
extraction drive means for linearly moving the extractor body with respect to the extractor frame;
a plurality of rollers each secured to the extractor frame for supporting the extractor frame and the extractor body for manipulating the apparatus relative to the heat exchanger shell; and
a plurality of hydraulic cylinders each having a ground engaging end and secured to the extractor frame for raising the extractor frame and the extractor body to a desired elevation with respect to the heat exchanger shell for extracting and reinstalling the heat exchanger tube assembly.

14. The apparatus as defined in claim 13, further comprising:
the extractor frame including a plurality of spreader bar securing members; and
a spreader bar for interconnection with the spreader bar securing members for supporting the extractor frame and the extractor body from the spreader bar.

15. The apparatus as defined in claim 13, further comprising:
an elongate carriage member for supporting the extractor body; and
a pair of elongate forks for selective connection to the carriage member for positioning under and supporting the heat exchanger tube assembly.

16. The apparatus as defined in claim 13, wherein the force transmitting member comprises:
a push/pull plate pivotably connected to an extractor body support and pivotable between a pull position for removal of the heat exchanger tube assembly and a push position for insertion of the heat exchanger tube assembly.

* * * * *